US010213990B2

(12) United States Patent
Nhan et al.

(10) Patent No.: US 10,213,990 B2
(45) Date of Patent: Feb. 26, 2019

(54) METHODS TO MAKE STRETCHABLE ELASTIC LAMINATES

(71) Applicant: Kimberly-Clark Worldwide, Inc., Neenah, WI (US)

(72) Inventors: Davis Dang Hoang Nhan, Appleton, WI (US); Shiming Zhuang, Menasha, WI (US); Theodore T. Tower, Appleton, WI (US); Alphonse Carl DeMarco, Greenville, WI (US); Peiguang Zhou, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 14/145,500

(22) Filed: Dec. 31, 2013

(65) Prior Publication Data

US 2015/0183191 A1    Jul. 2, 2015

(51) Int. Cl.
*B32B 23/08* (2006.01)
*B32B 37/18* (2006.01)
(Continued)

(52) U.S. Cl.
CPC .............. *B32B 23/08* (2013.01); *B32B 5/142* (2013.01); *B32B 27/302* (2013.01); *B32B 27/32* (2013.01);
(Continued)

(58) Field of Classification Search
CPC ....... B32B 23/08; B32B 37/02; B32B 37/153; B32B 37/182; B32B 38/0012; B32B 38/06; B32B 38/12; B32B 38/164; B32B 2038/0056; B32B 2038/166; B32B 2038/168; B32B 2250/02; B32B 2307/51; B32B 37/32; B32B 37/302; B32B 37/144; B32B 38/0028; B32B 2274/00; B32B 2555/00; B32B 2555/02; B32B 2307/518;
(Continued)

(56) References Cited

U.S. PATENT DOCUMENTS 2,531,396 A * 11/1950 Carter ..................... C01B 33/44
501/146
2,957,512 A   10/1960 Wade et al.
(Continued)

FOREIGN PATENT DOCUMENTS

EP       0187726 A2    7/1986
EP       0556749 A1    8/1993
(Continued)

OTHER PUBLICATIONS

International Search Report and Written Opinion for PCT/IB2014/066729 (dated Apr. 8, 2015).
(Continued)

*Primary Examiner* — Frank J Vineis
*Assistant Examiner* — Michael Zhang
(74) *Attorney, Agent, or Firm* — Armstrong Teasdale LLP

(57) ABSTRACT

Stretchable elastic laminates having an improved cloth-like appearance, as well as methods of preparing the laminates, are disclosed herein. Particularly, the present disclosure is directed to methods of preparing tissue-elastic laminates with uniform tissue fractures as the laminate is stretched 50%, or even 100%, or more in at least one of the machine direction (MD) or cross direction (CD).

20 Claims, 4 Drawing Sheets

(51) Int. Cl.
  *B32B 37/15* (2006.01)
  *B32B 37/02* (2006.01)
  *B32B 38/00* (2006.01)
  *B32B 38/06* (2006.01)
  *B32B 38/12* (2006.01)
  *B32B 37/14* (2006.01)
  *B32B 5/14* (2006.01)
  *B32B 27/30* (2006.01)
  *B32B 27/32* (2006.01)
  *B32B 38/16* (2006.01)

(52) U.S. Cl.
  CPC .......... *B32B 37/144* (2013.01); *B32B 37/153* (2013.01); *B32B 37/182* (2013.01); *B32B 38/06* (2013.01); *B32B 38/164* (2013.01); *B32B 2038/0028* (2013.01); *B32B 2038/0056* (2013.01); *B32B 2038/166* (2013.01); *B32B 2038/168* (2013.01); *B32B 2250/02* (2013.01); *B32B 2274/00* (2013.01); *B32B 2305/20* (2013.01); *B32B 2307/51* (2013.01); *B32B 2307/518* (2013.01); *B32B 2555/00* (2013.01); *Y10T 156/10* (2015.01); *Y10T 156/1039* (2015.01); *Y10T 428/3188* (2015.04); *Y10T 428/31971* (2015.04)

(58) Field of Classification Search
  CPC ........ B32B 2307/168; B32B 2307/166; B32B 2307/0056; B32B 2305/20; B32B 2305/02; Y10T 156/10; Y10T 428/31971; Y10T 428/3188
  USPC .......................................... 428/219, 532, 507
  See application file for complete search history.

(56) References Cited

U.S. PATENT DOCUMENTS

| | | | |
|---|---|---|---|
| 3,953,638 A | 4/1976 | Kemp | |
| 4,081,502 A | 3/1978 | Blumel et al. | |
| 4,197,377 A | 4/1980 | Bohm et al. | |
| 4,259,220 A | 3/1981 | Bunnelle et al. | |
| 4,340,684 A * | 7/1982 | Bohm | C08L 9/06 525/192 |
| 4,375,448 A | 3/1983 | Appel et al. | |
| 4,494,278 A | 1/1985 | Kroyer et al. | |
| 4,514,345 A | 4/1985 | Johnson et al. | |
| 4,525,407 A | 6/1985 | Ness | |
| 4,528,239 A | 7/1985 | Trokhan | |
| 4,606,964 A | 8/1986 | Wideman | |
| 4,640,810 A | 2/1987 | Laursen et al. | |
| 4,652,487 A | 3/1987 | Morman | |
| 4,657,802 A | 4/1987 | Morman | |
| 4,663,220 A | 5/1987 | Wisneski et al. | |
| 4,789,699 A | 12/1988 | Kieffer et al. | |
| 4,880,682 A | 11/1989 | Hazelton et al. | |
| 4,939,016 A | 7/1990 | Radwanski et al. | |
| 5,098,522 A | 3/1992 | Smurkoski et al. | |
| 5,260,171 A | 11/1993 | Smurkoski et al. | |
| 5,275,700 A | 1/1994 | Trokhan | |
| 5,328,565 A | 7/1994 | Rasch et al. | |
| 5,334,289 A | 8/1994 | Trokhan et al. | |
| 5,334,446 A | 8/1994 | Quantrille et al. | |
| 5,344,691 A | 9/1994 | Hanschen et al. | |
| 5,354,597 A | 10/1994 | Capik et al. | |
| 5,376,430 A | 12/1994 | Swenson et al. | |
| 5,389,202 A | 2/1995 | Everhart et al. | |
| 5,431,786 A | 7/1995 | Rasch et al. | |
| 5,496,624 A | 3/1996 | Stelljes, Jr. et al. | |
| 5,500,277 A | 3/1996 | Trokhan et al. | |
| 5,514,523 A | 5/1996 | Trokhan et al. | |
| 5,527,171 A | 6/1996 | Soerensen | |
| 5,554,467 A | 9/1996 | Trokhan et al. | |
| 5,566,724 A | 10/1996 | Trokhan et al. | |
| 5,624,790 A | 4/1997 | Trokhan et al. | |
| 5,628,741 A | 5/1997 | Buell et al. | |
| 5,628,876 A | 5/1997 | Ayers et al. | |
| 5,733,617 A | 3/1998 | Baduel | |
| 5,800,903 A | 9/1998 | Wood et al. | |
| 5,804,021 A * | 9/1998 | Abuto | B32B 5/26 156/229 |
| 5,814,413 A | 9/1998 | Beerwart | |
| 5,861,074 A | 1/1999 | Wu | |
| 5,882,769 A | 3/1999 | McCormack et al. | |
| 5,885,908 A | 3/1999 | Jaeger et al. | |
| H001798 H | 7/1999 | Modic | |
| H001808 H | 10/1999 | Djiauw et al. | |
| 6,057,024 A | 5/2000 | Mleziva et al. | |
| 6,258,196 B1 | 7/2001 | Suzuki et al. | |
| 6,372,067 B1 | 4/2002 | Kobayashi et al. | |
| 6,384,123 B1 | 5/2002 | Young | |
| 6,436,529 B1 | 8/2002 | Deeb et al. | |
| 6,481,483 B1 | 11/2002 | Kobayashi et al. | |
| H002096 H * | 1/2004 | Erderly | 525/314 |
| 6,682,803 B2 | 1/2004 | McCormack et al. | |
| 6,794,024 B1 * | 9/2004 | Walton | A61F 13/51458 428/317.9 |
| 7,078,089 B2 | 7/2006 | Ellis et al. | |
| 7,291,382 B2 | 11/2007 | Krueger et al. | |
| 7,449,240 B2 | 11/2008 | Hamulski et al. | |
| 7,498,282 B2 | 3/2009 | Patel et al. | |
| 7,799,418 B2 | 9/2010 | Champion | |
| 7,807,593 B2 | 10/2010 | Patel et al. | |
| 7,834,236 B2 | 11/2010 | Middlesworth et al. | |
| 7,879,452 B2 | 2/2011 | Muslet | |
| 7,910,658 B2 | 3/2011 | Chang et al. | |
| 7,922,854 B2 | 4/2011 | Sabbagh et al. | |
| 8,034,440 B2 | 10/2011 | Morman et al. | |
| 8,167,490 B2 | 5/2012 | Hu et al. | |
| 8,168,853 B2 | 5/2012 | Autran et al. | |
| 8,901,249 B2 | 12/2014 | Schedenig et al. | |
| 2002/0016122 A1 * | 2/2002 | Curro | A47L 1/15 442/381 |
| 2002/0088534 A1 | 7/2002 | Kobayashi et al. | |
| 2002/0187304 A1 | 12/2002 | McCormack et al. | |
| 2003/0017345 A1 | 1/2003 | Middlesworth et al. | |
| 2003/0083434 A1 * | 5/2003 | Ouhadi | C08L 23/04 525/80 |
| 2003/0124309 A1 | 7/2003 | Hamulski et al. | |
| 2004/0087235 A1 | 5/2004 | Morman et al. | |
| 2004/0089412 A1 | 5/2004 | Topolkaraev | |
| 2004/0121683 A1 | 6/2004 | Jordan et al. | |
| 2004/0122408 A1 | 6/2004 | Potnis et al. | |
| 2004/0122409 A1 | 6/2004 | Thomas et al. | |
| 2005/0043460 A1 | 2/2005 | McCormack et al. | |
| 2005/0049566 A1 | 3/2005 | Vukos et al. | |
| 2005/0148730 A1 | 7/2005 | Day et al. | |
| 2005/0148732 A1 * | 7/2005 | Thomas | C08L 51/006 525/232 |
| 2005/0282028 A1 | 12/2005 | Huber | |
| 2006/0062980 A1 | 3/2006 | Iyer | |
| 2006/0068187 A1 * | 3/2006 | Krueger | A61L 15/225 428/304.4 |
| 2006/0135024 A1 | 6/2006 | Thomas et al. | |
| 2006/0216473 A1 * | 9/2006 | Tomany et al. | 428/137 |
| 2006/0286386 A1 | 12/2006 | Sabbach et al. | |
| 2007/0049888 A1 | 3/2007 | Soerens et al. | |
| 2007/0078222 A1 | 4/2007 | Chang et al. | |
| 2007/0092704 A1 | 4/2007 | Patel et al. | |
| 2007/0141303 A1 * | 6/2007 | Steindorf | B32B 27/12 428/136 |
| 2007/0141352 A1 | 6/2007 | Calhoun et al. | |
| 2007/0155900 A1 | 7/2007 | Chang et al. | |
| 2007/0254176 A1 | 11/2007 | Patel | |
| 2007/0298262 A1 | 12/2007 | Quiram et al. | |
| 2008/0003910 A1 | 1/2008 | Hughes | |
| 2008/0132866 A1 * | 6/2008 | Siqueira | A61F 13/4902 604/378 |
| 2008/0145670 A1 | 6/2008 | Song et al. | |
| 2008/0176036 A1 * | 7/2008 | Mitchell | B32B 3/10 428/136 |
| 2008/0177242 A1 | 7/2008 | Chang | |

(56) References Cited

U.S. PATENT DOCUMENTS

| | | | |
|---|---|---|---|
| 2008/0207071 A1 | 8/2008 | Muslet et al. | |
| 2008/0314535 A1* | 12/2008 | Hilbig | D21H 27/40 162/109 |
| 2009/0163361 A1 | 6/2009 | Handlin et al. | |
| 2009/0258210 A1* | 10/2009 | Iyad et al. | 428/220 |
| 2010/0008958 A1 | 1/2010 | Mundschau et al. | |
| 2010/0081353 A1 | 4/2010 | Sabbagh et al. | |
| 2010/0267882 A1 | 10/2010 | Clunk et al. | |
| 2011/0160687 A1* | 6/2011 | Welch | A61F 13/15593 604/367 |
| 2011/0177735 A1 | 7/2011 | Tasi et al. | |
| 2012/0238162 A1* | 9/2012 | Muslet et al. | 442/1 |
| 2012/0277703 A1 | 11/2012 | Rhein et al. | |
| 2012/0291949 A1 | 11/2012 | Thomas et al. | |
| 2013/0048204 A1 | 2/2013 | Chang et al. | |

FOREIGN PATENT DOCUMENTS

| | | |
|---|---|---|
| EP | 0685586 A2 | 12/1995 |
| EP | 0682678 B1 | 12/1998 |
| JP | 8188950 A | 7/1996 |
| KR | 100918290 B1 | 9/2009 |
| KR | 1020110076494 A | 7/2011 |
| KR | 1020120116160 A | 10/2012 |
| RU | 2310565 C2 | 11/2007 |
| RU | 2478668 C2 | 4/2013 |
| WO | 9418263 A | 8/1994 |
| WO | 9829239 A1 | 7/1998 |
| WO | 9925912 A1 | 5/1999 |
| WO | 0008622 A1 | 2/2000 |
| WO | 0132116 A1 | 5/2001 |
| WO | 2009094506 A1 | 7/2009 |
| WO | 2012090095 A2 | 7/2012 |
| WO | 2015095731 A1 | 6/2015 |
| WO | 2015095749 A1 | 6/2015 |

OTHER PUBLICATIONS

International Search Report and Written Opinion for PCT/IB2014/066731 (dated Apr. 14, 2015).
Non-final Office action issued for U.S. Appl. No. 14/134,755 (dated Nov. 24, 2014).
International Search Report and Written Opinion issued for PCT/IB2015/055914 (dated Oct. 27, 2015), 9 pages.
International Search Report and Written Opinion for PCT/IB2015/051661 (dated May 28, 2015).
European Search Report for EP 14 87 2876, dated Apr. 12, 2017, 5 pgs.
Wikipedia: "Pixel", retrieved from the Internet: URL https://fr.wikipedia.org/wiki/Pixel on Aug. 15, 2017, 3 pages.
European Search Report for EP 14 87 7244, dated Aug. 25, 2017, 18 pgs.
Supplemental European Search Report issued in EP 15861787, dated Mar. 12, 2018, 11 pages.

* cited by examiner

SAMPLE 1 - ORIGINAL

SAMPLE 1 - BINARY

SAMPLE 2 - ORIGINAL

SAMPLE 2 - BINARY

SAMPLE 3 - ORIGINAL

SAMPLE 3 - BINARY

SAMPLE 4 - ORIGINAL

SAMPLE 4 - BINARY

METHODS TO MAKE STRETCHABLE ELASTIC LAMINATES

FIELD OF DISCLOSURE

The present disclosure is directed to methods of preparing stretchable elastic laminates with improved cloth-like appearance. Particularly, the present disclosure is directed to methods of preparing tissue-elastic laminates with uniform tissue fractures as the laminate is stretched at least 50% in at least one of the machine direction (MD) or cross direction (CD). In some embodiments, the thermoplastic elastomeric film of the laminates includes a combination of polyolefin-based thermoplastic elastomers, styrenic block copolymers, and inorganic clay. In some embodiments, the films are suitably free of calcium carbonate.

Elastic laminates have conventionally been used to provide comfort and sufficient sealing functions in personal care products. For example, elastic laminates are used in side panels, ear attachments, and waist bands in diapers and training pants. In today's market, the elastic laminates are based on an elastic polymer laminated with a non-woven material as facing. These non-woven facing materials enhance the laminates' mechanical strength as elastic films are not alone typically strong enough to prevent breaking in case of overstretching the laminate by the consumer. The materials additionally prevent elastic film blocking during high speed processing. Further, the non-woven facing materials, made from synthetic polymer e.g., polypropylene, polyethylene, or other polyolefins, provide improved cloth-like appearance of the laminate.

A stronger elastomeric film for use in an elastic laminate would thus shift the strength burden away from the facing materials. More particularly, there is a need in the art to prepare cellulosic/elastic film, and in particular tissue-elastic, laminates having reduced basis weight or no facing materials, yet maintaining or improving the cloth-like appearance and soft feel as found in current elastic-nonwoven laminates. Accordingly, the present disclosure is directed to methods of preparing elastic laminates, and in particularly suitable embodiments, tissue-elastic laminates, having increased elastic strength, while providing the softer cloth-like appearance at a lower cost as compared to current non-woven facing materials. Further, the laminates are advantageously naturally sustainable.

BRIEF DESCRIPTION OF THE DISCLOSURE

Methods of preparing stretchable elastic laminates having an improved mechanical strength and cloth-like appearance are disclosed. The basic steps for preparing such laminates include bonding/laminating a facing cellulosic layer to one or both surfaces of an elastic film and followed by a proper stretching process to give the laminate desired surface features and properties. Particularly, it has been surprisingly found that by weakening one or more cellulosic material layers of the elastic laminate prior to, during, or subsequent to the lamination or bonding, and in particular, the tissue web of a tissue-elastic laminate, the laminate takes on a cloth-like appearance and softness feel at least similar to traditional elastic-nonwoven laminates. In some embodiments, the weakening is achieved by embossing the cellulosic facing layer(s) with a designated surface pattern on embossing rollers, the embossed cellulosic material layer is bonded to an elastic film through thermal bonding, adhesive bonding, pressure bonding or other means, and then the laminate is subjected to a proper stretching in one or both of the machine direction (MD) or cross direction (CD) to create the desired surface properties. In other embodiments, the weakening is achieved by wetting the laminate including the cellulosic material after the lamination process and then stretching the wetted elastic laminate including the cellulosic material in one or both of the machine direction (MD) or cross direction (CD).

The present disclosure has further found that laminating or bonding a cellulosic material layer to one or both surfaces of an elastic film thermally, adhesively or by pressure bonding is only one necessary step for preparing stretchable elastic laminates, but is not sufficient alone to give them cloth-like surface features. The pre-lamination weakening and subsequent-to-lamination stretching or the subsequent-to-lamination weakening and then stretching must also be performed properly to create improved mechanical strength and cloth-like appearance.

According to the methods of the present disclosure, the stretchable elastic laminates are prepared such that one or more of the following properties are obtained: upon stretching to an elongation of at least 150% in one or both of the MD or CD, the laminates have less than 10% total surface area of gaps being greater than 1 mm (measured as length in the stretch direction), upon stretching to an elongation of at least 100% in one or both of the MD or CD, the laminates have less than 10% total surface area of gaps being greater than 0.5 mm (measured as length in the stretch direction), and upon stretching to an elongation of at least 50% in one or both of the MD or CD, the laminates have less than 10% total surface area of gaps being greater than 0.2 mm (measured as length in the stretch direction).

In some embodiments, when stretched to an elongation of 150% in one or both of the MD or CD, the laminates have more than 90% total surface area of gaps being smaller than 0.5 mm (measured as length in the stretch direction), including more than 90% total surface area of gaps being smaller than 0.2 mm (measured as length in the stretch direction). In other embodiments, when stretched to an elongation of at least 150% in one or both of the MD or CD, the laminates have more than 95% total surface area of gaps being smaller than 1 mm (measured as length in the stretch direction), including more than 95% total surface area of gaps being smaller than 0.5 mm (measured as length in the stretch direction), including more than 95% total surface area of gaps being smaller than 0.2 mm (measured as length in the stretch direction). In yet other embodiments, when stretched to an elongation of at least 150% in one or both of the MD or CD, the laminates have more than 98% total surface area of gaps being smaller than 1 mm (measured as length in the stretch direction), including more than 98% total surface area of gaps being smaller than 0.5 mm (measured as length in the stretch direction), including more than 98% total surface area of gaps being smaller than 0.2 mm (measured as length in the stretch direction).

In some embodiments, when stretched to an elongation of 100% in one or both of the MD or CD, the laminates have less than 10% total surface area of gaps being greater than 1 mm (measured as length in the stretch direction), including less than 10% total surface area of gaps being greater than 0.5 mm (measured as length in the stretch direction), and including less than 10% total surface area of gaps being greater than 0.2 mm (measured as length in the stretch direction). In other embodiments, when stretched to an elongation of at least 100% in one or both of the MD or CD, the laminates have greater than 95% total surface area of gaps being smaller than 1 mm (measured as length in the stretch direction), including more than 95% total surface area of gaps being smaller than 0.5 mm (measured as length in the stretch direction), including more than 95% total surface area of gaps being smaller than 0.2 mm (measured as length in the stretch direction). In yet other embodiments, when stretched to an elongation of at least 100% in one or both of the MD or CD, the laminates have more than 98% total surface area of gaps being smaller than 1 mm (measured as length in the stretch direction), including more than 98% total surface area of gaps being smaller than 0.5 mm (measured as length in the stretch direction), including more than 98% total surface area of gaps being smaller than 0.2 mm (measured as length in the stretch direction).

In some embodiments, when stretched to an elongation of 50% in one or both of the MD or CD, the laminates have less than 10% total surface area of gaps being greater than 1 mm (measured as length in the stretch direction), including less than 10% total surface area of gaps being greater than 0.5 mm (measured as length in the stretch direction), and including less than 10% total surface area of gaps being greater than 0.2 mm (measured as length in the stretch direction). In other embodiments, when stretched to an elongation of at least 50% in one or both of the MD or CD, the laminates have more than 95% total surface area of gaps being smaller than 1 mm (measured as length in the stretch direction), including more than 95% total surface area of gaps being smaller than 0.5 mm (measured as length in the stretch direction), including more than 95% total surface area of gaps being smaller than 0.2 mm (measured as length in the stretch direction). In yet other embodiments, when stretched to an elongation of at least 50% in one or both of the MD or CD, the laminates have more than 98% total surface area of gaps being smaller than 1 mm (measured as length in the stretch direction), including more than 98% total surface area of gaps being smaller than 0.5 mm (measured as length in the stretch direction), including more than 98% total surface area of gaps being smaller than 0.2 mm (measured as length in the stretch direction).

In yet other embodiments, when stretched to an elongation of 50% in one or both of the MD or CD, the laminates have less than 50% total surface area of gaps being greater than 5 mm (measured as length in the stretch direction), including less than 40% total surface area of gaps being greater than 5 mm (measured as length in the stretch direction), and including less than 30% total surface area of gaps being greater than 5 mm (measured as length in the stretch direction). In other embodiments, when stretched to an elongation of 100% in one or both of the MD or CD, the laminates have less than 50% total surface area of gaps being greater than 5 mm (measured as length in the stretch direction), including less than 40% total surface area of gaps being greater than 5 mm (measured as length in the stretch direction), and including less than 30% total surface area of gaps being greater than 5 mm (measured as length in the stretch direction). And, in yet other embodiments, when stretched to an elongation of 150% in one or both of the MD or CD, the laminates have less than 50% total surface area of gaps being greater than 5 mm (measured as length in the stretch direction), including less than 40% total surface area of gaps being greater than 5 mm (measured as length in the stretch direction), and including less than 30% total surface area of gaps being greater than 5 mm (measured as length in the stretch direction).

Accordingly, in one aspect, the present disclosure is directed to a stretchable elastic laminate comprising a weakened cellulosic material affixed to a thermoplastic elastomeric film having a first surface and a second surface opposite the first surface. The stretchable elastic laminate comprises one of the following: upon stretching to an elongation of 150% in one or both the machine direction or cross direction, the laminate comprises less than 50% total surface area of gaps being greater than 5 mm in length as measured in the stretch direction, upon stretching to an elongation of 150% in one or both the machine direction or cross direction, the laminate comprises less than 10% total surface area of gaps being greater than 1 mm in length as measured in the stretch direction, upon stretching to an elongation of 100% in one or both the machine direction or cross direction, the laminate comprises less than 10% total surface area of gaps being greater than 0.5 mm in length as measured in the stretch direction, and upon stretching to an elongation of 50% in one or both the machine direction or cross direction, the laminate comprises less than 10% total surface area of gaps being greater than 0.2 mm in length as measured in the stretch direction.

In another embodiment, the present disclosure is directed to a method for preparing a stretchable elastic laminate. The method comprises: weakening a cellulosic material; bonding the cellulosic material to at least one surface of a thermoplastic elastomeric film; and then stretching and relaxing the laminate to prepare a stretchable elastic laminate, the laminate comprising one of the following, upon stretching to an elongation of 150% in one or both the machine direction or cross direction, the laminate comprises less than 50% total surface area of gaps being greater than 5 mm in length as measured in the stretch direction, upon stretching to an elongation of 150% in one or both the machine direction or cross direction, the laminate comprises less than 10% total surface area of gaps being greater than 1 mm in length as measured in the stretch direction, upon stretching to an elongation of 100% in one or both the machine direction or cross direction, the laminate comprises less than 10% total surface area of gaps being greater than 0.5 mm in length as measured in the stretch direction, and upon stretching to an elongation of 50% in one or both the machine direction or cross direction, the laminate comprises less than 10% total surface area of gaps being greater than 0.2 mm in length as measured in the stretch direction.

In yet another embodiment, the present disclosure is directed to a method for preparing a stretchable elastic laminate, the method comprising: extruding a molten thermoplastic elastomeric film; pressure bonding a first surface of the molten thermoplastic elastomeric film to a cellulosic material such to prepare an elastic laminate; wetting the elastic laminate; stretching the wetted elastic laminate in one or both of the machine direction or cross direction; relaxing the stretched elastic laminate; and drying the relaxed elastic laminate.

DESCRIPTION OF THE FIGURES

FIG. 1A shows the total gap area of all gaps over 0.1 mm in length in the stretch direction. The elastic laminate labeled "Sample 1" corresponds to FIGS. 2A and 2B with 19% gap area corresponding to the white area in FIG. 2B. The elastic laminate labeled "Sample 2" of FIG. 1A corresponds to FIGS. 2C and 2D. Here, only a few pixels are detected as gaps, leading to <0.1% gap area.

FIG. 3A shows the total gap area of all gaps over 0.1 mm in length in the stretch direction. The elastic laminate labeled "Sample 3" corresponds to FIGS. 4A and 4B. The elastic laminate labeled "Sample 4" of FIG. 3A corresponds to FIGS. 4C and 4D.

DETAILED DESCRIPTION

Definitions

Figure 1A:
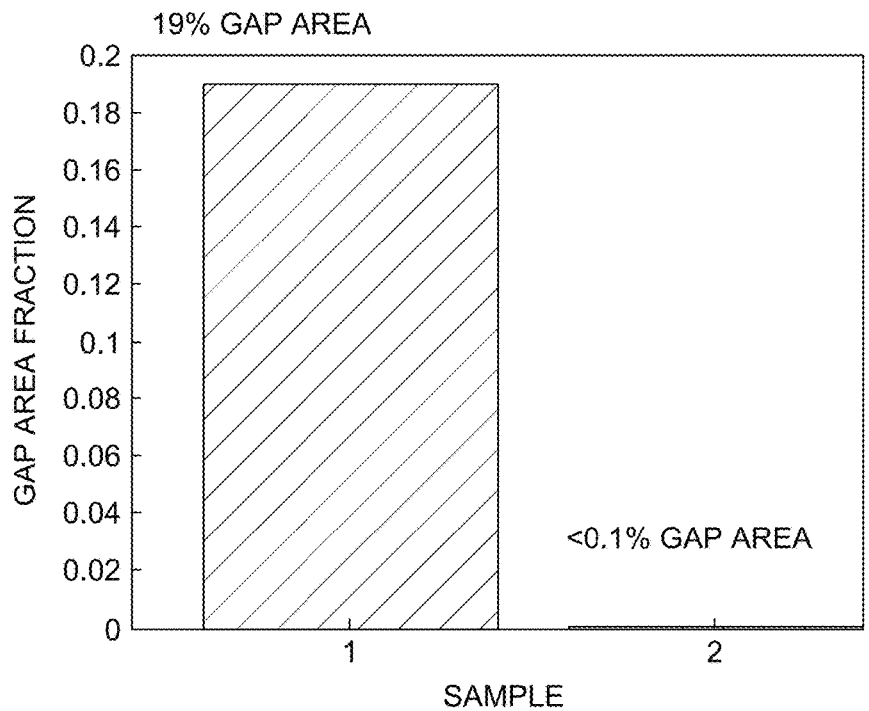
FIG. 1A is a cumulative area fraction plot depicting the amount of area fraction contributed by each length of gap of the elastic laminates analyzed in Example 1. Particularly.

As used herein, the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the term "non-woven material" refers to a material made from synthetic polymeric fibers such as fibers of synthetic polyolefins (e.g., polypropylene, polyethylene, polybutene, and copolymers with carbons up to C12, and the like), bonded together by chemical, mechanical, heat, or solvent treatment. The "non-woven material" material also has a structure of individual fibers or threads which are interlaid, but not in an identifiable manner as in a knitted fabric. The "non-woven material" has been formed from many processes, such as, for example, meltblowing processes, spunbonding processes, bonded carded web processes. As used herein, the terms "machine direction" or MD refers to the direction along the length of a fabric in the direction in which it is produced. The terms "cross machine direction," "cross direction," "cross directional," or CD refers to the direction across the width of the fabric, i.e., a direction generally perpendicular to the MD.

As used herein, the terms "weaken," "weakening," "weakened" refer to the loss of strength/rigidity within the cellulosic material by weakening/breaking hydrogen bonds throughout the fibrous material. Typically, the cellulosic materials that are weakened using the methods of the present disclosure include weakened regions, or gaps, sized (measured as length of gap in the stretch direction) from about 0.025 mm to about 5 mm, including from about 0.025 mm to about 2 mm, including from about 0.05 mm to about 1 mm, including from about 0.75 mm to about 0.5 mm, and including from about 0.1 mm to about 0.25 mm.

As used herein, the gaps in the cellulosic material and/or laminate are measured as follows. A 2"×2" area of tissue-elastic laminate can be imaged through thresholding using standard digital or analog cameras with appropriate lens and incident lighting as known in the art. Thresholding is the process of taking a gray-level image and forcing it to one of two categories, based on gray-level. The pixel size of the image should be smaller than the smallest gap that is desired to be detected (e.g., <0.1 mm). Illumination should be as uniformly lit as possible with final adjustments being possible through flat-field correction using a surface of uniform white color and a dull finish, such as a plain piece of paper. The thresholding level should be chosen to provide the best separation from cellulosic material regions and film regions (i.e., gaps). If the film and cellulosic material cannot be easily discriminated, one may use transmission illumination for optical density differences, staining of the cellulosic fibers, or other techniques capable of developing contrast between the two structures. The thresholding operation on the image creates a black and white image where one phase represents the laminate where the cellulosic material is substantially bonded to the film, and the other phase is where there are visible gaps in the cellulosic material, leading to a visible difference in appearance. The total surface area fraction of gaps can be calculated directly as the sum of the film phase pixels divided by the total number of pixels.

To measure the gap size distribution, the sample is stretched to the specified strain (e.g., 50%), imaged and thresholded to generate the binary image. If the strain is in the vertical direction with respect to the image, then each column of pixels is measured for all the regions of contiguous pixels comprising a gap. Having processed all the columns, this results in a list of gap width measurements (e.g., N1 regions of L1 pixels long, N2 regions of L2 pixels long, and so on). The area fraction of gaps of a particular size can be found by the product of the number of gaps of a certain length by that length, divided by the total number of pixels in the image (i.e., $N*L/(X*Y)$, where the image is X by Y pixels in dimension). Similarly, the area fraction of gaps larger than a certain size can be found by adding the individual area fraction contributions.

Particularly suitable in the present disclosure, is the method of weakening the cellulosic material in a uniform manner (also referred to herein as "uniform tissue fracturing") such that, upon stretching the laminate made from the weakened cellulosic material, the laminate has improved cloth-like appearance and feel similar to laminates made with non-woven material. Suitably, the elastic laminates have one or more of any of combination of the following properties: upon stretching to an elongation of at least 150% in one or both of the MD or CD, the laminates have less than 50% total surface area, including less than 40% total surface area, and including less than 30% total surface area, of gaps being greater than 5 mm (measured as length of gap in the stretch direction); upon stretching to an elongation of at least 150% in one or both of the MD or CD, the laminates have less than 10% total surface area, including less than 5% total surface area, and including less than 2% total surface area, of gaps being greater than 1 mm (measured as length of gap in the stretch direction); upon stretching to an elongation of at least 100% in one or both of the MD or CD, the laminates have less than 10% total surface area, including less than 5% total surface area, and including less than 2% total surface area, of gaps being greater than 0.5 mm (measured as length of gap in the stretch direction); and upon stretching to an elongation of at least 50% in one or both of the MD or CD, the laminates have less than 10% total surface area, including less than 5% total surface area, and including less than 2% total surface area, of gaps being greater than 0.2 mm (measured as length of gap in the stretch direction).

In other embodiments, weakening of the cellulosic material provides for the elastic laminates having one or more of any combination of the following properties: upon stretching to an elongation of 150% in one or both of the MD or CD, the laminates have less than 10% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); upon stretching to an elongation of at least 100% in one or both of the MD or CD, the laminates have less than 10% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); and upon stretching to an elongation of at least 50% in one or both of the MD or CD, the laminates have less than 10% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction).

In still other embodiments, weakening of the cellulosic material provides for the elastic laminates having one or more of any combination of the following properties: upon stretching to an elongation of 150% in one or both of the MD or CD, the laminates have less than 5% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); upon stretching to an elongation of at least 100% in one or both of the MD or CD, the laminates have less than 5% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); and upon stretching to an elongation of at least 50% in one or both of the MD or CD, the laminates have less than 5% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction).

In still other embodiments, weakening of the cellulosic material provides for the elastic laminates having one or more of any combination of the following properties: upon stretching to an elongation of 150% in one or both of the MD or CD, the laminates have less than 2% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); upon stretching to an elongation of at least 100% in one or both of the MD or CD, the laminates have less than 2% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction); and upon stretching to an elongation of at least 50% in one or both of the MD or CD, the laminates have less than 2% total surface area of gaps being sized greater than 0.2 mm (measured as length of gap in the stretch direction), including sized greater than 0.5 mm (measured as length of gap in the stretch direction), and including sized greater than 1 mm (measured as length of gap in the stretch direction).

As used herein, the term "laminate" refers to a composite structure of two or more sheet material layers that have been adhered through a bonding step, such as through adhesive bonding, thermal bonding, point bonding, pressure bonding, extrusion coating, extrusion laminating, or ultrasonic bonding.

As used herein, the term "elastomeric" shall be interchangeable with the term "elastic" and refers to sheet material, which can be elongated by at least 25 percent of its relaxed length and which will recover, upon release of the applied force, at least 10 percent of its elongation. It is generally desirable that the elastomeric material or composite be capable of being elongated by at least 100 percent, more desirably by at least 300 percent, of its relaxed length and recover, upon release of an applied force, at least 50 percent of its elongation. As used herein, the term "thermoplastic" refers to a polymer which is capable of being melt processed.

The present disclosure is directed to methods of preparing stretchable elastic laminates with weakened cellulosic material as the laminate is stretched 50%, including 100%, including 150%, and including 200% or more in at least one of the machine direction (MD) or cross direction (CD). Upon stretching, the weakened cellulosic material provides laminates having improved cloth-like appearance without the use of costly nonwoven facing materials. Accordingly, the stretchable elastic laminates of the present disclosure can provide for improved appearance and feel of personal care products such as diapers, training pants, swimwear, absorbent underpants, adult incontinence products, and feminine hygiene products, such as feminine care pads, napkins, and pantiliners.

Generally, the methods of the present disclosure include weakening a cellulosic material and bonding a cellulosic material to at least one surface of a thermoplastic elastomeric film. The weakening can be prior to, during, or after bonding. In some embodiments, the laminate further includes a second cellulosic material affixed to a second opposing surface of the thermoplastic elastomeric film. In some embodiments, the first and second cellulosic materials are the same cellulosic materials. In other embodiments, the first and second cellulosic materials are different cellulosic materials.

In one embodiment, the cellulosic material is a tissue web, as this provides substantial loft characteristics to the elastic laminate and is further water absorbent. Accordingly, when discussing the cellulosic material throughout the entirety of this application, it should be understood that the cellulosic material may suitably be tissue, however, it can alternatively be any other cellulosic material known in the art. The basis weight of the cellulosic material may generally vary, such as from about 2 grams per square meter ("gsm") to 20 gsm, in some embodiments from about 5 gsm to about 15 gsm, and in some embodiments, from about 8 gsm to about 12 gsm. Lower basis weight cellulosic materials may be preferred in some applications. For instance, lower basis weight materials may provide even better cost saving without compromising performance.

Fibers suitable for making the cellulosic material, and particularly, the tissue web material, comprise any natural or synthetic cellulosic fibers including, but not limited to non-woody fibers, such as cotton, abaca, kenaf, sabai grass, flax, esparto grass, straw, jute hemp, bagasse, milkweed floss fibers, bamboo fibers, algae fibers, corn stover fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods.

In general, any process capable of forming a fibrous web can be utilized to form the cellulosic material. For example, a papermaking process can utilize creping, wet creping, double creping, embossing, wet pressing, air pressing, through-air drying, creped through-air drying, uncreped through-air drying, air laying, coform methods, as well as other steps known in the art.

Chemically treated natural cellulosic fibers can be used such as mercerized pulps, chemically stiffened or cross-linked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of 65% or greater, more specifically 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In order to create stretchable elastic laminates with controlled gaps (i.e., gaps sized as described above), the cellulosic material should be weakened in a very fine pattern (e.g., weakened pattern having an interval of from about 0.125 mm to about 5 mm, including from about 0.125 mm to about 1 mm, and including from about 0.25 mm to about 0.75 mm) such that the product of modulus and thickness of the cellulosic material is three times or less than that of the thermoplastic elastomeric film. This is equivalent to saying that the deformation/strain energy within the film layer is at least a third of that in the cellulosic material so that the film plays the dominant role in the deformation process of the laminate material, which minimizes or eliminates the catastrophic fracturing and larger gaps within the surface (e.g. cellulosic) layer(s) of elastic laminate.

In one embodiment, the cellulosic material can be weakened by embossing the material using any method known in the embossing art and as further described, for example, with respect to the tissue sheets disclosed in any of the following U.S. Pat. No. 4,514,345 issued on Apr. 30, 1985, to Johnson et al.; U.S. Pat. No. 4,528,239 issued on Jul. 9, 1985, to Trokhan; U.S. Pat. No. 5,098,522 issued on Mar. 24, 1992; U.S. Pat. No. 5,260,171 issued on Nov. 9, 1993, to Smurkoski et al.; U.S. Pat. No. 5,275,700 issued on Jan. 4, 1994, to Trokhan; U.S. Pat. No. 5,328,565 issued on Jul. 12, 1994, to Rasch et al.; U.S. Pat. No. 5,334,289 issued on Aug. 2, 1994, to Trokhan et al.; U.S. Pat. No. 5,431,786 issued on Jul. 11, 1995, to Rasch et al.; U.S. Pat. No. 5,496,624 issued on Mar. 5, 1996, to Steltjes, Jr. et al.; U.S. Pat. No. 5,500,277 issued on Mar. 19, 1996, to Trokhan et al.; U.S. Pat. No. 5,514,523 issued on May 7, 1996, to Trokhan et al.; U.S. Pat. No. 5,554,467 issued on Sep. 10, 1996, to Trokhan et al.; U.S. Pat. No. 5,566,724 issued on Oct. 22, 1996, to Trokhan et al.; U.S. Pat. No. 5,624,790 issued on Apr. 29, 1997, to Trokhan et al.; and, U.S. Pat. No. 5,628,876 issued on May 13, 1997, to Ayers et al., the disclosures of which are incorporated herein by reference to the extent that they are non-contradictory herewith. In particularly suitable embodiments, the cellulosic material is embossed using a patterned metal roll against a smooth rubber roll to weaken the bonding between fibers at designated areas and to provide a desired strength of the cellulosic material. Embossing pre-weakens the cellulosic material, the pre-weakened material then fully weakens to provide desired surface properties upon stretching of the elastic laminate in one or both the MD or CD to an elongation of at least 50%, including at least 100%, including at least 150%, and including at least 200% or more.

Stretching the elastic laminate including the cellulosic material can be accomplished using any stretching means known in the laminate art.

Typically, an embossed pattern in the cellulosic material can be configured in any manner known in the art, for example, wire-mesh patterns, dot patterns of circular pins, triangular pins, square pins, diamond pins, elliptical pins, rectangular pins or bar-shaped pins, and combinations thereof. Further, embossing provides the cellulosic material with an embossed pattern having an interval of from about 0.125 mm to about 5 mm, including from about 0.125 mm to about 1 mm, and including from about 0.25 mm to about 0.75 mm. For example, the embossing may be ridges that are spaced at intervals of from about 0.125 mm to about 5 mm, including from about 0.125 mm to about 1 mm, and including from about 0.25 mm to about 0.75 mm.

In yet other embodiments, the cellulosic material can be weakened by wetting the material (alone or in combination with the thermoplastic elastomeric film as an elastic laminate) prior to stretching the laminate as described below. More particularly, wetting the cellulosic material weakens hydrogen bonds, thereby allowing weakening when the cellulosic material and/or elastic laminate is stretched in one or both of the MD or CD to an elongation of at least 50%, including at least 100%, including at least 150%, and including at least 200% or more.

Any solvents known in the cellulosic material art can be used to wet the material. For example, solvents such as water or alcohol or combinations thereof can be used in the methods of the present disclosure.

Generally, when wetted, the cellulosic material is weakened by wetting to the degree that the cellulosic layer(s) contains 30 to 150% moisture or preferably 50% to 80% moisture Without weakening, such as through embossing or wetting of the cellulosic material, high strength cellulosic material would dominate the deformation process of the elastic laminate under stretching, resulting in a large catastrophic tear, e.g., greater than 10% total surface area of the laminate having gaps larger than 1 mm (measured as length of gap in the stretch direction) in size when the laminate is stretched to an elongation of 50%, 100%, and/or 150% in one or both of the MD and CD. Uncontrolled fracture/tear of the cellulosic material makes the laminate aesthetically unpleasing.

The cellulosic material, embossed or without embossing, is bonded with at least a first surface of a thermoplastic elastomeric film to form an elastic laminate. Typically, the bonding strength between the cellulosic material and the thermoplastic elastomeric film should be sufficient to avoid delamination as known in the art.

In one embodiment, the cellulosic material and thermoplastic elastomeric film are thermally bonded together as known in the laminating arts. For example, in some embodiments, the cellulosic material and thermoplastic elastomeric film are thermally bonded using patterned nip rolls having temperatures ranging from about 100° C. to about 350° C., including from about 120° C. to about 180° C., using nip load forces of from about 1000 N/m to about 20000 N/m (roughly 6-112 pounds per linear inch), and using nip surface speeds of from about 5 m/min. to about 500 m/min., including from about 20 m/min. to about 200 m/min. In suitable embodiments when the cellulosic material is embossed, the patterned nip rolls include a pattern that is smaller in scale as compared to the embossing pattern used with to uniformly pre-weakened the cellulosic material.

In another embodiment, the cellulosic material can be thermally bonded to a molten thermoplastic elastomeric film. In one embodiment, the bonder is adjacent to the film extruder such that the cellulosic material is contacted and bonded to the thermoplastic elastomeric film, while in a molten state, as the film exits the extruder.

In other embodiments, the cellulosic material and thermoplastic elastomeric film are chemically bonded together such as through the use of an adhesive composition. For example, the cellulosic material and thermoplastic elastomeric film may be adhesively bonded using known adhesive compositions (e.g., hot melt adhesive compositions) at add-on amounts ranging from about 1 gsm to about 20 gsm, including from about 2 gsm to about 15 gsm, and including about 4 gsm to about 8 gsm, using nip load forces of from about 1000 N/m to about 20000 N/m (roughly 6-112 pounds per linear inch), and using nip surface speeds of from about 5 m/min. to about 500 m/min., including from about 20 m/min. to about 200 m/min.

In some embodiments, the adhesive composition is first applied to the thermoplastic elastomeric film prior to contacting and bonding the thermoplastic elastomeric film with the cellulosic material.

In yet other embodiments, the cellulosic material and thermoplastic elastomeric film are pressure bonded together. Typically, when pressure bonding, the cellulosic material is pressure bonded with the thermoplastic elastomeric film immediately subsequent to the extrusion of the film, when the film is still in a molten state. The roller nip setting for pressure bonding of the cellulosic material to molten elastomeric film can be either by fixed nip gap or by nip force control. For the former case, if the pattern roller(s) has pin height or depth similar to the thickness of cellulosic layer that is measured with controlled loading of 364 kg/m$^2$ (235 grams per square inch), the nominal gap setting is about 60% to 100% of the film thickness. For instance, in laminating a 14 gsm cellulosic layer to each side of a film of basis weight of 130 gsm, the nominal thicknesses of cellulosic material and film are about 0.089 mm and 0.120 mm respectively, and a wire mesh with wire spacing of 0.282 mm and wire diameter of 0.089 mm, the gap setting between two rollers with wire mesh mounted at the surface is about 0.090 mm to 0.100 mm, which is about 75% to 85% of the film thickness 0.120 mm. For nip force control setting, the nip force is expected to range from 1000 N/m to 20000 N/m, similar to the nip force needed in the case of the thermal bonding.

Once the elastic laminate is prepared by bonding the cellulosic material to the thermoplastic elastomeric film, the cellulosic material is weakened by wetting the elastic laminate to the degree that the cellulosic layer(s) contains 30 to 150% moisture or preferably 50% to 80% moisture and stretching the wetted elastic laminate as described above in one or both of the MD or CD to an elongation of at least 50%, at least 100%, at least 150%, or even 200% or more as described above.

After stretching, the elastic laminate is allowed to relax back to, or close to, its natural state.

When weakening of the cellulosic material is accomplished through use of wetting the laminate, the laminate should be dried after stretching and relaxation. Drying of the laminate can be accomplished through any drying means known in the art, including evaporation or air drying using an air dryer or impingement dryer. Typically, the dried elastic laminate will have less than 10% by weight moisture, including less than 5% by weight moisture, and including less than 2% by weight moisture.

The thermoplastic elastomeric films for use in the elastic laminates of the present disclosure have a basis weight of from about 10 gsm to about 300 gsm, including from about 40 gsm to about 150 gsm, and including from about 60 gsm to about 100 gsm.

Any of a variety of thermoplastic elastomeric polymers may be employed in the present disclosure, such as elastomeric polyesters, elastomeric polyurethanes, elastomeric polyamides, elastomeric copolymers, elastomeric polyolefins, and so forth.

In particularly suitable embodiments, the thermoplastic elastomeric film includes a combination of polyolefin-based thermoplastic elastomers and styrenic block copolymers.

Examples of polyolefin-based thermoplastic elastomers suitable for use in the films include, among others, a crystalline polyolefin, for example, a homopolymer or a copolymer of an α-olefin having 1 to 20 carbon atoms, and including 1 to 12 carbon atoms.

Examples of crystalline polyolefins include homopolymers and copolymers described below.

(1) Ethylene homopolymer

The ethylene homopolymer may be prepared by any one of a low-pressure process and a high-pressure process.

(2) Copolymers of ethylene and not more than 10% by mol of α-olefins other than ethylene or vinyl monomers such as vinyl acetate and ethyl acrylate; examples include ethylene octene copolymer, available as Engage 8407 or Engage 8842 (Dow Chemical, Houston, Tex.)

(3) Propylene homopolymer; examples include polypropylene impact copolymer PP7035E4 and polypropylene random copolymer PP9574E6 (Exxon Mobil, Houston, Tex.)

(4) Random copolymers of propylene and not more than 10% by mol of α-olefins other than propylene (5) Block copolymers of propylene and not more than 30% by mol of α-olefins other than propylene (6) 1-Butene homopolymer (7) Random copolymers of 1-butene and not more than 10% by mol of α-olefins other than 1-butene (8) 4-Methyl-1-pentene homopolymer (9) Random copolymers of 4-methyl-1-pentene and not more than 20% by mol of α-olefins other than 4-methyl-1-pentene Examples of the α-olefins include ethylene, propylene, 1-butene, 4-methyl-1-pentene, 1-hexene and 1-octene.

Exemplary commercially available polyolefin-based thermoplastic elastomers for use in the films include VISTAMAXX™ (propylene-based elastomer, available from ExxonMobil Chemical, Houston, Tex.), INFUSE™ (olefin block copolymers, available from Dow Chemical Company, Midland, Mich.), VERSIFY™ (propylene-ethylene copolymers) such as VERSIFY™ 4200 and VERSIFY™ 4300 (Dow Chemical Company, Midland, Mich.), ENGAGE™ (ethylene octane copolymer, available from Dow Chemical, Houston, Tex.), and NOTIO 0040 and NOTIO 3560 (available from Mitsui Chemical (USA), New York, N.Y. In one particularly suitable embodiment, the polyolefin-based thermoplastic elastomer is VISTAMAXX™ 6102FL.

In an alternative embodiment, the thermoplastic elastomer may be thermoplastic ester/ether elastomers or thermoplastic polyurethanes, including PEBAX® block amide elastomers (commercially available from Arkema, France).

The thermoplastic elastomeric films generally include greater than 50% by weight thermoplastic elastomer, and in particular greater than 50% by weight thermoplastic polyolefin elastomer, including greater than 55% by weight, including greater than 60% by weight, including greater than 65% by weight, including greater than 70% by weight, including greater than 75%, and including greater than 80% by weight thermoplastic elastomer. In suitable embodiments, the thermoplastic elastomeric film includes 50% by weight thermoplastic elastomer. In yet other suitable embodiments, the thermoplastic elastomeric film includes about 62% by weight thermoplastic elastomer. In yet other suitable embodiments, the thermoplastic elastomeric film includes about 65% by weight thermoplastic elastomer. In still other suitable embodiments, the thermoplastic elastomeric film includes about 82% by weight, or even about 83% by weight, thermoplastic elastomer.

When the thermoplastic elastomeric film includes thermoplastic polyolefin elastomers, the thermoplastic elastomeric film may additionally include a styrenic block copolymer. It has unexpectedly been found that the addition of styrenic block copolymers provides improved mechanical strength to the film. Additionally, the combination of a thermoplastic elastomer and styrenic block copolymer allows for high speed processing. Based on these improved processing, functional and structural characteristics, the thermoplastic elastomeric films allow for personal care products such as disposable diapers, training pants, and the like, to be made to have improved comfort, strength and sealing functions. More particularly, in some embodiments, the thermoplastic elastomeric films can be used to provide strength while further allowing for reduced basis weight as less to no facing materials can be used in the personal care product. Further, the thermoplastic elastomeric films have improved poke-through performance. As used herein, "poke-through performance" generally refers to the durability or toughness of a film to resist tearing of the film during use, such as the ability of the film to resist a user poking through the film with his finger.

Exemplary styrenic block copolymers for use with the thermoplastic elastomers include hydrogenated polyisoprene polymers such as styrene-ethylenepropylene-styrene (SEPS), styrene-ethylenepropylene-styrene-ethylenepropylene (SEPSEP), hydrogenated polybutadiene polymers such as styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), hydrogenated poly-isoprene/butadiene polymer such as styrene-ethylene-ethylenepropylene-styrene (SEEPS), and hydrogenated vinyl-polyisoprene/hydrogenated polyisoprene/polystyrene triblock polymers such as commercially available as HYBRAR™ 7311 (Kuraray America, Inc., Houston, Tex.), and combinations thereof. Polymer block configurations such as diblock, triblock, multiblock, star and radial are also contemplated in this disclosure. In some instances, higher molecular weight block copolymers may be desirable. Block copolymers are available from Kraton Polymers U.S. LLC of Houston, Tex. under the designations, for example, Kraton MD6716, Kraton D1102, Kraton SIBS D1102, Kraton D1184, Kraton FG1901, and Kraton FG1924, and Septon Company of America, Pasadena, Tex. under the designations Septon 8007, Septon V9827, and Septon 9618. Another potential supplier of such polymers includes Dynasol of Spain. In particular, Kraton MD6716 SEPS triblock polymer is particularly suitable for the present disclosure.

The thermoplastic elastomeric films may generally include from about 15% to about 40% by weight styrenic block copolymer, including about 30% by weight styrenic block copolymer.

Surprisingly, the thermoplastic elastomeric films for use in the elastic laminates of the present disclosure have a tensile strength that is 40% to about 100% greater than a thermoplastic elastomeric film without a styrenic block copolymer. In some embodiments, the films have a tensile strength that is from about 50% to about 80% greater than a thermoplastic elastomeric film without a styrenic block copolymer.

In particularly suitable embodiments, to further improve the strength of the thermoplastic elastomeric films, the films may additionally include a strength enhancing agent. As used herein, "strength enhancing agent" refers to a physically compounded master batch or blend of organic polymers and up to 60% by weight inorganic particles, which can reinforce the blends of thermoplastic elastomer and styrenic block copolymer or make a stronger thermoplastic film in terms of increased tensile strength at break with a lower elongation at break without compromised elastic properties in terms of hysteresis and permanent set after 150% elongation.

Suitable strength enhancing agents include inorganic clays, and in suitable embodiments, include, for example, polymer grade montmorillonites, which are high purity aluminosilicate minerals referred to as phyllosilicates. Montmorillonites have a sheet-like or plate-like structure. Although their dimensions in the length and width directions can be measured in hundreds of nanometers, the mineral's thickness is only one nanometer. As a result, individual sheets have aspect ratios (length/width (1/w) or thickness/diameter (t/d)) varying from about 200 to about 1000, and in particularly suitable embodiments, from about 200 to about 400.

In some embodiments, the strength enhancing agents are inorganic clay particles such as Nanocor I.44P (available from Nanocor, Hoffman Estates, Ill.) having an average particle size of less than 20 microns in diameter, including from about 10 microns to about 15 microns in diameter, and in particularly suitably embodiments, are about 13 microns in diameter. In other embodiments, the strength enhancing agents are blends of inorganic clay and propylene such as Nanocor PP master batch (available from Nanocor, Hoffman Estates, Ill.).

The thermoplastic elastomeric films may generally include from about 2% to about 10% by weight strength enhancing agent, including from about 3% to about 8% by weight, and including from about 3% to about 5% by weight strength enhancing agent.

The thermoplastic elastomer films may further include processing aids and or tackifiers associated with the elastomer polymers as known in the film-making art.

In some embodiments, the thermoplastic elastomeric films may be substantially free of calcium carbonate. In this context, and unless otherwise specified, the term "substantially free" means that the thermoplastic elastomer films contain less than a functional amount of calcium carbonate, typically less than 1%, including less than 0.5%, including less than 0.1%, including less than 0.05%, including less than 0.015%, including less than 0.001%, and also including zero percent, by total weight of the thermoplastic elastomeric film.

Having described the disclosure in detail, it will be apparent that modifications and variations are possible without departing from the scope of the disclosure defined in the appended claims.

EXAMPLE

The following non-limiting Examples are provided to further illustrate the present disclosure.

Example 1

In this Example, two elastic laminates were stretched and analyzed for the presence of gaps.

The first laminate ("Sample 1") was a wire cloth-tissue-elastic-tissue-wire cloth laminate prepared by placing an elastic film between two tissue plies, available as Kleenex facial tissue (Kimberly-Clark Corporation, Dallas, Tex.). The elastic film was prepared by dry blending 30 wt % Kraton MD6716 SEBS (available from Kraton Polymers, Houston, Tex.) and 70 wt % VISTAMAXX® 6102FL (available from Exxon Mobile, Houston, Tex.) and then feeding the blend through the main feed section of a 1.5" Trinity II Killion Extruder with eight heated sections and a resin compounding screw design. The film was produced at a rate of about 15 pounds per hour. The temperature profile per section, beginning at the main feed section, was 187.8° C. (370° F.), 204.4° C. (400° F.), 204.4° C. (400° F.), 204.4° C. (400° F.), 204.4° C. (400° F.), 204.4° C. (400° F.), and 204.4° C. (400° F.). Screw speed was constant at 20 rpm. The extruded polymer was fed into a 20"-film die and collected with the chill roll set at about 18.3-21.1° C. (65-70° F.). The 20"-wide film was produced at a basis weight of about 90 gsm and a thickness of about 4 mil (0.102 mm). The tissue was originally 2-ply, however, was separated into individual ply, wherein each ply was about 214 mm×206 mm and had a basis weight of about 16 gsm. The tissue-elastic-tissue sandwich (178 mm×178 mm sheet) was then placed between two sheets of stainless steel wire cloth cut into 305 mm×305 mm sheets and used as a bonding pattern. The wire cloth (90×90 mesh, 0.0035" wire diameter) is available as 9230T537 from McMaster Carr, Elmhurst, Ill. The resulting laminate was put into a Carver press (Bench top press model 3893, available from Carver Inc., Wabash, Ind.) for lamination using the following settings: top platen temperature: 100° C. (212° F.); bottom platen temperature: 100° C. (212° F.); clamp force 1100 pound force; and dwell time: 30 seconds. After bonding, tissue-elastic-tissue laminate was removed from the wire cloth.

The second laminate ("Sample 2") included three sheets of the thermoplastic elastomeric film stacked on top of one another and placed between the two tissue plies. The tissue-elastic-elastic-elastic-tissue sandwich was then placed between two sheets of wire cloth as described for Sample 1. The wire cloth-tissue-elastic-tissue-wire cloth sandwich was put into the Carver press for lamination as described for Sample 1.

Subsequent to preparation, samples of each of the two laminates were each stretched to an elongation of 50% in the machine direction and a 30 mm×32 mm region was imaged. Gaps that appeared during stretching (as measured in the stretch direction) were then measured in the stretch direction using incident light and a dark background underneath the sample as described herein. The images were analyzed in MATLAB (R2010b, Mathworks, Inc., Natick, Mass.). The results are shown in FIGS. 1A, 1B, and FIGS. 2A-2D.

Figure 1B:
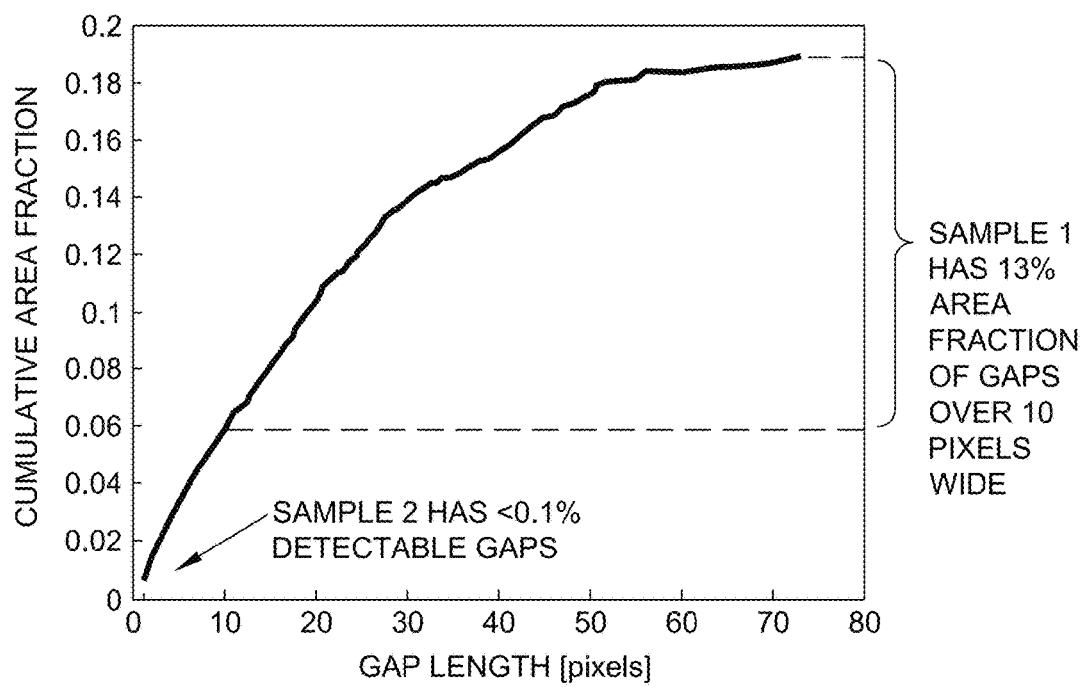
FIG. 1B is a graph depicting the total surface area fraction as a measure of all gaps greater than the pixel size (e.g., 1 pixel=0.09 mm) of the elastic laminates analyzed in Example 1.
Figure 2A:
FIGS. 2A-2D are image analyses showing the surface appearance of the elastic laminates analyzed in Example 1.
Figure 2B:
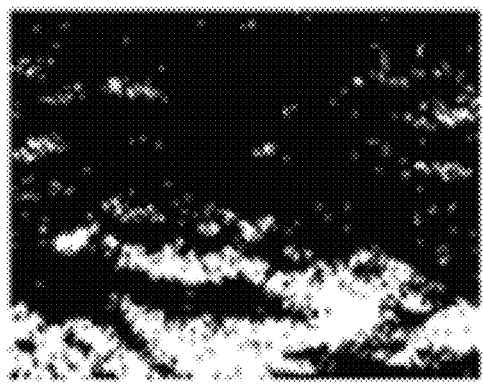
Figure 2C:
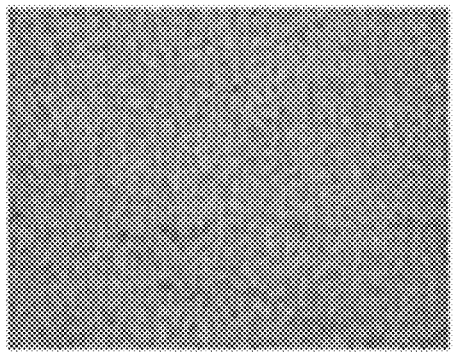
Figure 2D:
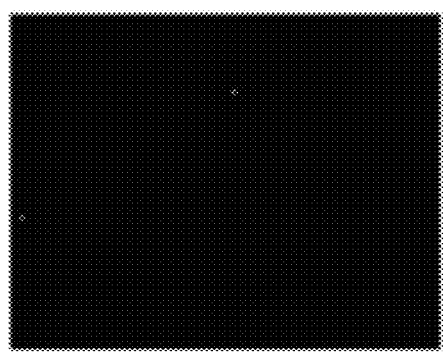
Figure 3A:
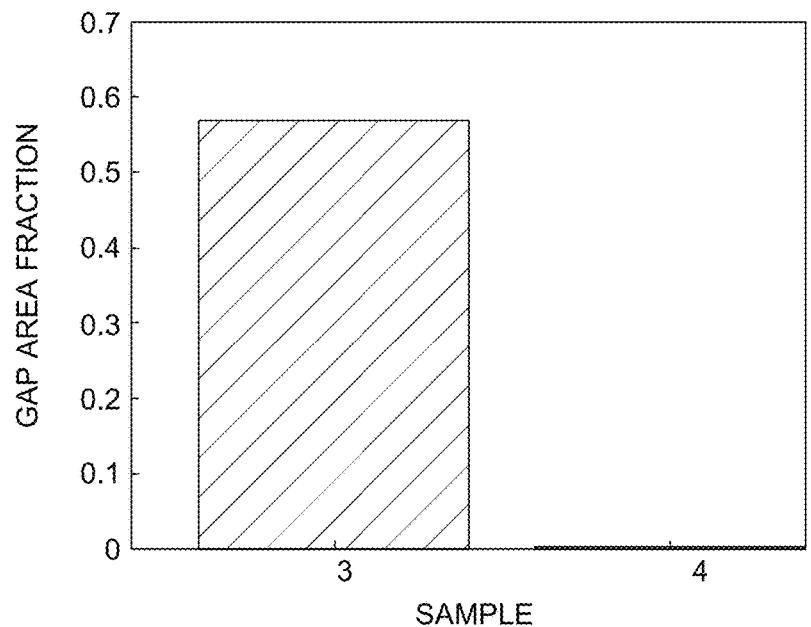
FIG. 3A is a cumulative area fraction plot depicting the amount of area fraction contributed by each length of gap of the elastic laminates analyzed in Example 2. Particularly.
Figure 3B:
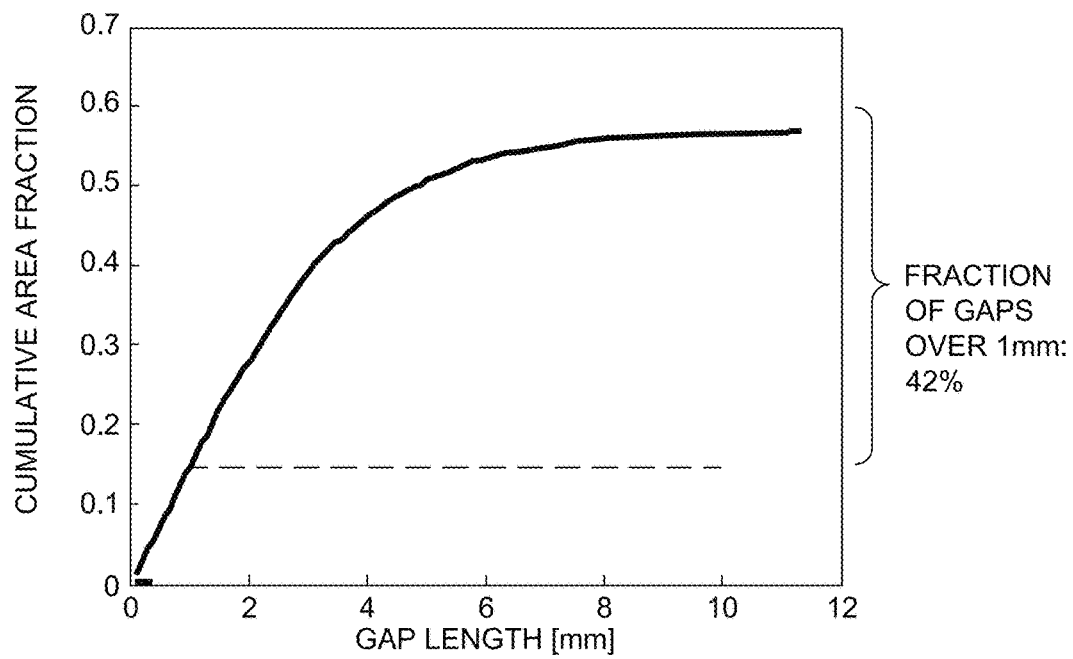
FIG. 3B is a graph depicting the total surface area fraction as a measure of all gaps greater than the pixel size (e.g., 1 pixel=0.09 mm) of the elastic laminates analyzed in Example 2.
Figure 4A:
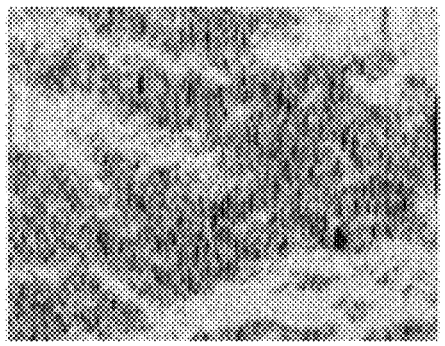
FIGS. 4A-4D are image analyses showing the surface appearance of the elastic laminates analyzed in Example 2.
Figure 4B:
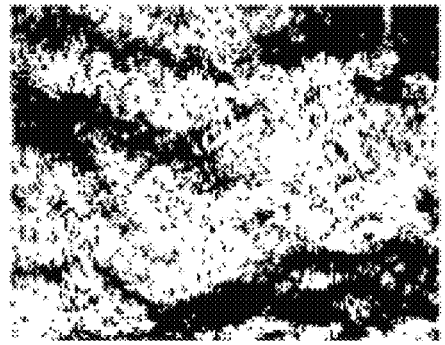
Figure 4C:
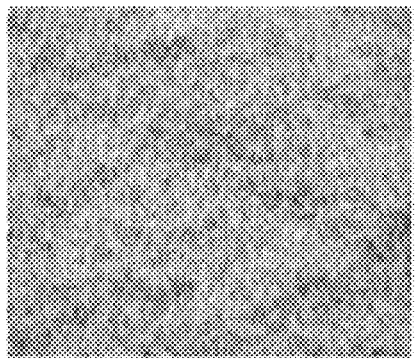
Figure 4D:
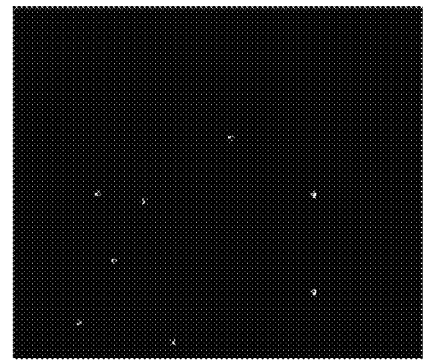

Specifically, as shown in FIGS. 1A and 1B, Sample 1 had 13% total surface area of gaps over 10 pixels in width, while Sample 2 had less than 0.1% total surface area of detectable gaps at all. As further shown in FIGS. 2A-2D, Sample 2 had a smoother, more uniform appearance than Sample 1. It is believed that Sample 2 showed these desired properties due to the use of three layers of elastic film, which provided higher basis weight of the film material, and thus, allowed the film layers to play the dominant role in the deformation process of the laminate material. As discussed above, this minimizes or eliminates the catastrophic fracturing and larger gaps within the surface (e.g. cellulosic) layer(s) of the elastic laminate.

Example 2

In this Example, the two elastic laminates prepared as described above for Example 1 were stretched to an elongation of 100% in the machine direction and again analyzed for the presence of gaps. Particularly, Sample 3 was prepared in the same manner as Sample 1 in Example 1 and Sample 4 was prepared in the same manner as Sample 2 in Example 1. The results are shown in FIGS. 3A, 3B, and FIGS. 4A-4D.

Example 3

In this Example, three elastic laminates were prepared and analyzed for the presence of uniform fracturing.

The first elastic laminate was prepared as described for Sample 1 in Example 1. The second elastic laminate was prepared as described for Sample 2 in Example 1. The third elastic laminate of this Example was comprised of the wire cloth-tissue-elastic-tissue-wire cloth laminate described for Sample 1 of Example 1. This third elastic laminate, however, was further dipped completely in a distilled water bath for a few seconds then removed and shaken to remove excess water. The third laminate was then stretched to an elongation of 150% in the machine direction, relaxed and allowed to air dry for four hours.

As described above, the first elastic laminate did not have uniform fracturing (i.e., showed a larger total surface area having detectable gaps) while the second and third elastic laminates did have uniform fracturing, and thus, a smoother appearance. The second elastic laminate had uniform fracturing as the use of three layers of elastic film provided higher basis weight of the film material, thus, allowing the film layers to play the dominant role in the deformation process of the laminate material, which as discussed above, minimizes or eliminates the catastrophic fracturing and larger gaps within the surface (e.g. cellulosic) layer(s) of the elastic laminate. This Example further shows that by weakening the cellulosic layers of the laminate (as in the third laminate), less elastic material can be used to provide similar laminate surface properties.

What is claimed is:

1. A stretchable elastic laminate comprising an embossed pre-weakened cellulosic material affixed to a thermoplastic elastomeric film having a first surface and a second surface opposite the first surface, wherein the film comprises from 65% by weight to 82% by weight of a polyolefin-based thermoplastic elastomer, from 15% by weight to 32% by weight of a styrenic block copolymer, and from 3% by weight to 8% by weight of a strength-enhancing agent, wherein the thermoplastic elastomeric film is substantially free of calcium carbonate; wherein upon stretching the embossed pre-weakened cellulosic material comprises gaps of from about 0.1 mm to about 0.25 mm as measured in the stretch direction, wherein the laminate comprises one of the following:
   upon stretching to an elongation of 150% in one or both the machine direction or cross direction, the laminate comprises less than 50% total surface area of gaps being greater than 5 mm in length as measured in the stretch direction,
   upon stretching to an elongation of 150% in one or both the machine direction or cross direction, the laminate comprises less than 10% total surface area of gaps being greater than 1 mm in length as measured in the stretch direction,
   upon stretching to an elongation of 100% in one or both the machine direction or cross direction, the laminate comprises less than 10% total surface area of gaps being greater than 0.5 mm in length as measured in the stretch direction, and
   upon stretching to an elongation of 50% in one or both the machine direction or cross direction, the laminate comprises less than 10% total surface area of gaps being greater than 0.2 mm in length as measured in the stretch direction.

2. The stretchable elastic laminate as set forth in claim 1 wherein the laminate comprises one of the following:
   upon stretching to an elongation of 150% in one or both the machine direction or cross direction, the laminate comprises less than 10% total surface area of gaps being greater than 0.5 mm in length as measured in the stretch direction,
   upon stretching to an elongation of 100% in one or both the machine direction or cross direction, the laminate comprises less than 5% total surface area of gaps being greater than 0.5 mm in length as measured in the stretch direction, and
   upon stretching to an elongation of 50% in one or both the machine direction or cross direction, the laminate comprises less than 5% total surface area of gaps being greater than 0.2 mm in length as measured in the stretch direction.

3. The stretchable elastic laminate as set forth in claim 1 wherein the laminate comprises one of the following:
   upon stretching to an elongation of 150% in one or both the machine direction or cross direction, the laminate comprises less than 10% total surface area of gaps being greater than 0.2 mm in length as measured in the stretch direction,
   upon stretching to an elongation of 100% in one or both the machine direction or cross direction, the laminate comprises less than 2% total surface area of gaps being greater than 0.5 mm in length as measured in the stretch direction, and
   upon stretching to an elongation of 50% in one or both the machine direction or cross direction, the laminate comprises less than 2% total surface area of gaps being greater than 0.2 mm in length as measured in the stretch direction.

4. The stretchable elastic laminate as set forth in claim 1 wherein, upon stretching to an elongation of 150% in one or both the machine direction or cross direction, the laminate comprises less than 5% total surface area of gaps being greater than 1 mm in length as measured in the stretch direction.

5. The stretchable elastic laminate as set forth in claim 1 wherein, upon stretching to an elongation of 150% in one or both the machine direction or cross direction, the laminate comprises less than 2% total surface area of gaps being greater than 1 mm in length as measured in the stretch direction.

6. The stretchable elastic laminate as set forth in claim 1 wherein the pre-weakened cellulosic material has a basis weight of from about 2 gsm to about 20 gsm.

7. The stretchable elastic laminate as set forth in claim 1 wherein the thermoplastic elastomeric film has a basis weight of from about 10 gsm to about 300 gsm.

8. The stretchable elastic laminate as set forth in claim 1 wherein the styrenic block copolymer is styrene-ethylenebutylene-styrene (SEBS).

9. The elastic laminate as set forth in claim 1 further comprising a second weakened cellulosic material affixed to the second surface of the thermoplastic elastomeric film.

10. A method for preparing a stretchable elastic laminate, the method comprising:
    weakening a cellulosic material;
    bonding the cellulosic material to at least one surface of a thermoplastic elastomeric film to prepare a laminate, the thermoplastic elastomeric film comprising from 65% by weight to 82% by weight of a polyolefin-based thermoplastic elastomer, from 15% by weight to 32% by weight of a styrenic block copolymer, and from 3% by weight to 8% by weight of a strength-enhancing agent, the laminate comprising one of the following, upon stretching to an elongation of 150% in one or both the machine direction or cross direction, the laminate comprises less than 50% total surface area of gaps being greater than 5 mm in length as measured in the stretch direction, upon stretching to an elongation of 150% in one or both the machine direction or cross direction, the laminate comprises less than 10% total surface area of gaps being greater than 1 mm in length as measured in the stretch direction, upon stretching to an elongation of 100% in one or both the machine direction or cross direction, the laminate comprises less than 10% total surface area of gaps being greater than 0.5 mm in length as measured in the stretch direction, and upon stretching to an elongation of 50% in one or both the machine direction or cross direction, the laminate comprises less than 10% total surface area of gaps being greater than 0.2 mm in length as measured in the stretch direction.

11. The method as set forth in claim 10 wherein the cellulosic material is weakened by embossing the cellulosic material prior to bonding the cellulosic material to the thermoplastic elastomeric film, and then stretching the laminate to an elongation of at least 50% in one or both of the machine direction or cross direction.

12. The method as set forth in claim 11 wherein the embossing provides for an embossed pattern interval of from about 0.125 mm to about 5 mm.

13. The method as set forth in claim 10 wherein the weakened cellulosic material is thermally bonded to the thermoplastic elastomeric film using heated patterned nip rolls having a temperature of from about 100° C. to about 350° C.

14. The method as set forth in claim 10 wherein the weakened cellulosic material is thermally bonded to a molten thermoplastic elastomeric film.

15. The method as set forth in claim 10 wherein the weakened cellulosic material is adhesively bonded to the thermoplastic elastomeric film.

16. The method as set forth in claim 10 wherein the cellulosic material is weakened by wetting the laminate after bonding of the cellulosic material to the thermoplastic elastomeric film, and then stretching the wetted laminate to an elongation of at least 50% in one or both of the machine direction or cross direction, relaxing the stretched laminate and drying the laminate.

17. The method as set forth in claim 16 wherein the laminate is wetted with a solvent selected from the group consisting of water, alcohol, and combinations thereof in an amount of from about 30% to about 150% by weight of the cellulosic material.

18. The method as set forth in claim 10 wherein the thermoplastic elastomeric film comprises a polyolefin-based thermoplastic elastomer, a styrenic block copolymer, and a strength enhancing agent, wherein the thermoplastic elastomeric film is substantially free of calcium carbonate.

19. A method for preparing a stretchable elastic laminate, the method comprising:
   extruding a molten thermoplastic elastomeric film comprising from 65% by weight to 82% by weight of a polyolefin-based thermoplastic elastomer, from 15% by weight to 32% by weight of a styrenic block copolymer, and from 3% by weight to 8% by weight of a strength-enhancing agent;
   pressure bonding a first surface of the molten thermoplastic elastomeric film to a cellulosic material such to prepare an elastic laminate;
   wetting the elastic laminate;
   stretching the wetted elastic laminate in one or both of the machine direction or cross direction;
   relaxing the stretched elastic laminate; and
   drying the relaxed elastic laminate.

20. The method as set forth in claim 19 wherein the laminate is wetted with a solvent selected from the group consisting of water, alcohol, and combinations thereof in an amount of from about 30% to about 150% by weight of the cellulosic material.

* * * * *

UNITED STATES PATENT AND TRADEMARK OFFICE
CERTIFICATE OF CORRECTION

PATENT NO. : 10,213,990 B2
APPLICATION NO. : 14/145500
DATED : February 26, 2019
INVENTOR(S) : Nhan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Tenth Day of December, 2019

Andrei Iancu
*Director of the United States Patent and Trademark Office*